US006561587B2

United States Patent
Elio et al.

(10) Patent No.: US 6,561,587 B2
(45) Date of Patent: May 13, 2003

(54) VARIABLE CLUTCHING SEAT RECLINER MECHANISM

(75) Inventors: Paul A. Elio, Phoenix, AZ (US);
Robert E. Glaspie, Phoenix, AZ (US);
Hariharan K. Sankaranarayanan,
Scottsdale, AZ (US)

(73) Assignee: Elio Engineering, Inc., Phoenix, AZ (US)

(*) Notice: Subject to any disclaimer, the term of this patent is extended or adjusted under 35 U.S.C. 154(b) by 0 days.

(21) Appl. No.: 09/867,328

(22) Filed: May 29, 2001

(65) Prior Publication Data

US 2001/0048238 A1 Dec. 6, 2001

Related U.S. Application Data

(60) Provisional application No. 60/208,385, filed on May 30, 2000.

(51) Int. Cl.[7] .............................. B60N 2/02; B60N 2/22
(52) U.S. Cl. ................ 297/374; 297/354.12; 192/223.4
(58) Field of Search ................................ 297/374, 375, 297/354.12; 192/44, 45, 223.4; 74/89.17, 530, 531; 188/82.6; 267/273

(56) References Cited

U.S. PATENT DOCUMENTS

| | | | |
|---|---|---|---|
| 4,408,799 A | 10/1983 | Bowman | |
| 4,441,381 A | 4/1984 | Haugk | |
| 4,452,098 A | 6/1984 | Wallace et al. | |
| 4,533,027 A | 8/1985 | Otani et al. | |
| 5,163,736 A | 11/1992 | Aljundi | |
| 5,382,076 A | 1/1995 | Scheck et al. | |
| 5,833,317 A | * 11/1998 | Massara et al. | 297/374 |
| 6,267,444 B1 | * 7/2001 | Schumann | 192/223 |

* cited by examiner

*Primary Examiner*—Anthony D. Barfield
(74) *Attorney, Agent, or Firm*—Parsons & Goltry; Robert A. Parsons; Michael W. Goltry

(57) ABSTRACT

Variable clutching seat recliner apparatus includes a drum coupled to a seat back, a band wrapped about the drum inhibiting rotation thereof, a tightening mechanism coupled to opposed ends of the band such that a force applied to the seat back in either of two opposing directions produces a tension in the band adjacent either end and a corresponding loosening of the band adjacent the other end. The tightening mechanism includes a lever pivotable about a fixed pivot point to convert a portion of the tension to reduce the loosening, and a variable control mechanism positioned proximate the lever for limiting pivotal movement of the lever.

20 Claims, 6 Drawing Sheets

VARIABLE CLUTCHING SEAT RECLINER MECHANISM

CROSS-REFERENCE TO RELATED APPLICATION

This application claims the benefit of U.S. Provisional Application Serial No. 60/208,385, filed May 30, 2000.

BACKGROUND OF THE INVENTION

1. Field of the Invention

This invention relates to seat recliner mechanisms.

More particularly, the present invention relates to controlled recliner release.

2. Prior Art

Reclining seat backs, particularly those provided in vehicles such as automobiles, have requirements for safety purposes. Current conventional seat reclining mechanisms securely lock a seat back at the desired degree of recline. The mechanism must be sufficiently robust to withstand forces generated in an accident or at least meet the criteria imposed on manufacturers. At some level a recliner mechanism will fail, allowing the seat back to freely move forward. This is particularly undesirable as an individual in the seat will be subjected to more injuries.

In a co-pending U.S. Patent Application entitled "SELF-TIGHTENING MECHANISM", bearing Ser. No. 09/588,136, filed on Jun. 2, 2000 now U.S. Pat. No. 6,375,263, and incorporated herein by reference, a recliner mechanism which has a clutching feature has been disclosed. The clutching feature permits the seat back to move forward if the forces generated are sufficiently great. This prevents a catastrophic failure of the recliner mechanism and absorbs much of the energy produced in an event such as a collision. By absorbing the energy, the individual in the seat is spared much of the injury that would otherwise have occurred.

While extremely effective, the clutching mechanism can only be adjusted with great difficulty and cannot be tailored to individuals quickly or easily. As an example, a larger individual requires a higher clutching threshold because the force generated by the individual's weight is greater, while a smaller individual needs a lower threshold. Thus, each different driver in an automobile, for example, would have to readjust the clutching mechanism, which requires an expertise in the clutching mechanism, time, and effort.

It would be highly advantageous, therefore, to remedy the foregoing and other deficiencies inherent in the prior art.

Accordingly, it is an object the present invention to provide a variable clutching seat recliner mechanism.

Another object of the present invention is to provide a system and method for varying the clutch mechanism under varying conditions.

SUMMARY OF THE INVENTION

Briefly, to achieve the desired objects of the present invention in accordance with a preferred embodiment thereof, provided is a variable clutching seat recliner apparatus including a drum coupled to a seat back, a band wrapped about the drum inhibiting rotation thereof, a tightening mechanism coupled to opposed ends of the band such that a force applied to the seat back in either of two opposing directions produces a tension in the band adjacent either end and a corresponding loosening of the band adjacent the other end. The tightening mechanism includes a lever pivotable about a fixed pivot point to convert a portion of the tension to reduce the loosening, and a variable control mechanism positioned proximate the lever for limiting pivotal movement of the lever.

BRIEF DESCRIPTION OF THE DRAWINGS

Specific objects and advantages of the invention will become readily apparent to those skilled in the art from the following detailed description thereof taken in conjunction with the drawings in which.

DETAILED DESCRIPTION OF A PREFERRED EMBODIMENT

Figure 1:
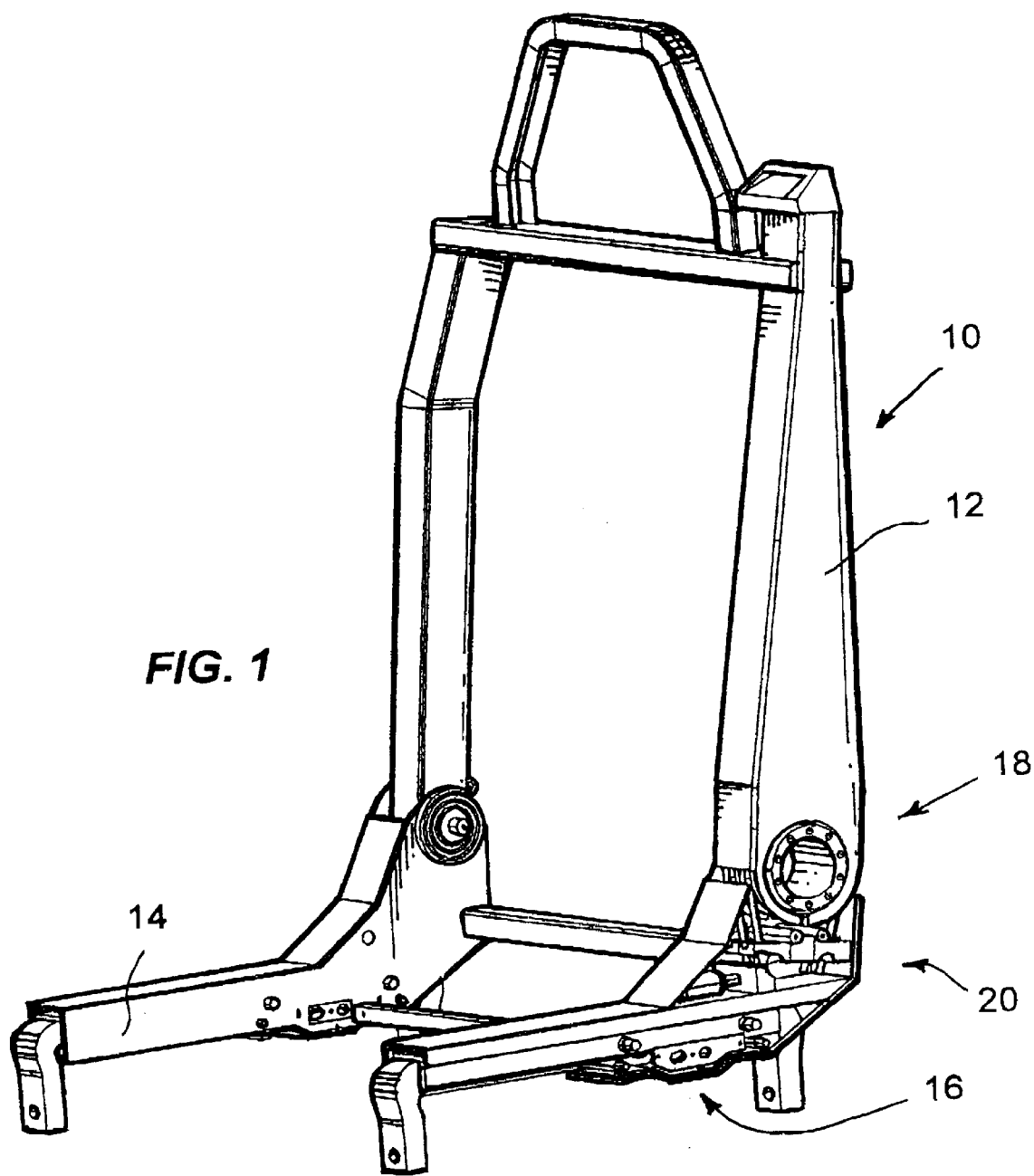
FIG. 1 is a perspective view of a seat framework and variable clutching recliner mechanism according to the present invention.

The present invention, a variable clutching recliner mechanism, is used in conjunction with apparatus that moves into a self tightening condition when a reclining element is loaded. Turning to FIG. 1, a seat frame generally designated 10, is illustrated. Seat frame 10 includes a back portion 12 and a bottom portion 14. Bottom portion 14 is adjustably mounted by a track mechanism 16 which will not be described in detail herein since it is not a portion of this invention. Back portion 12 is adjustably coupled to bottom portion 14 by a self tightening recliner mechanism 18. For specific details on the operation of track mechanism 16 and a recliner mechanism, see U.S. Patent entitled "ADJUSTABLE SUPPORT APPARATUS AND ARCHITECTURE FOR ADJUSTING SUPPORT APPARATUS", U.S. Pat. No. 6,070,938, issued Jun. 6, 2000, incorporated herein by reference. For specific details on the operation of self tightening recliner mechanism 18, see co-pending U.S. Patent Application entitled "SELF-TIGHTENING MECHANISM", Ser. No. 09/588,136, filed Jun. 2, 2000, now U.S. Pat. No. 6,375,365 incorporated herein by reference.

Figure 2:
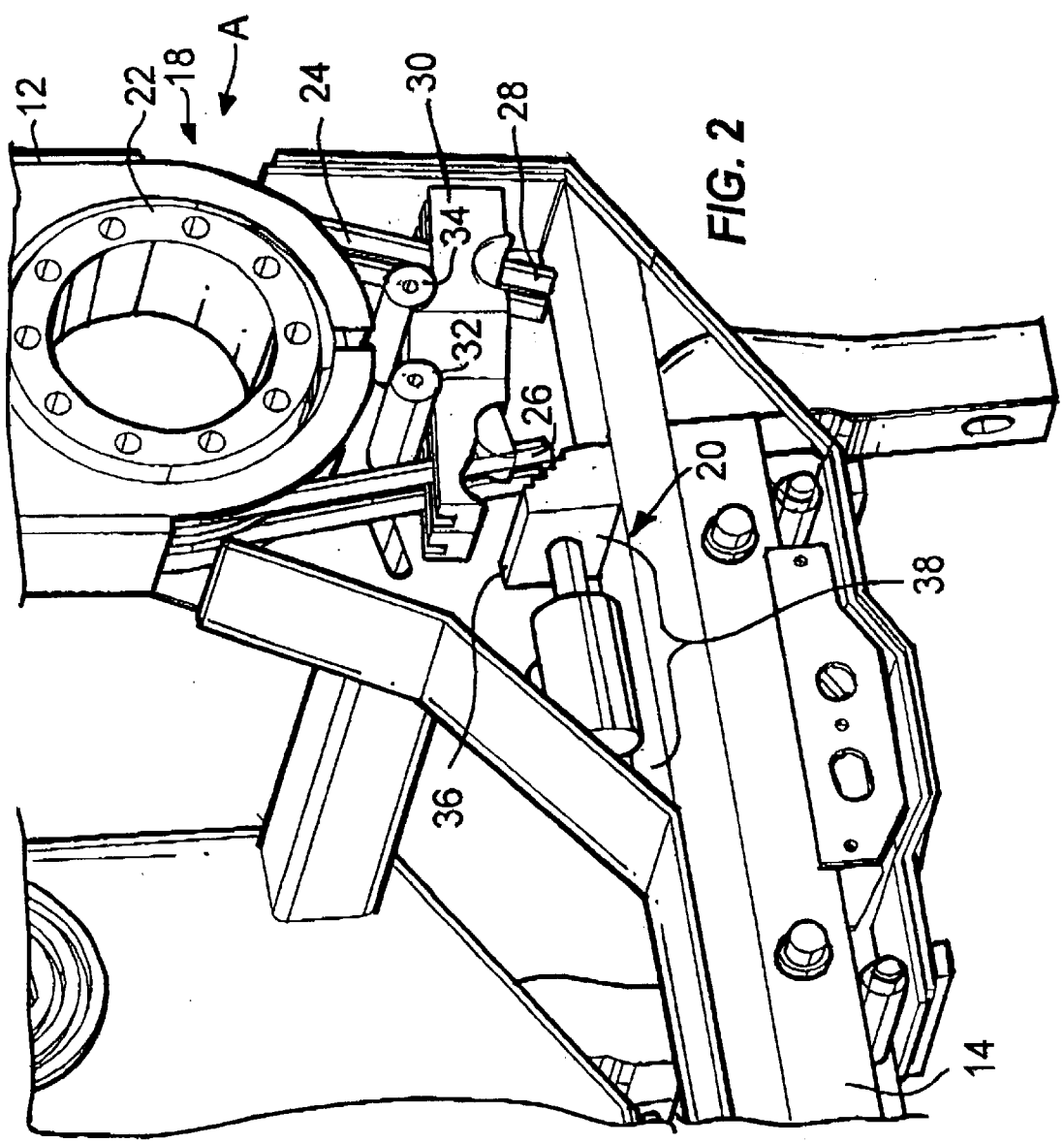
FIG. 2 is an enlarged perspective view of the variable clutching recliner mechanism of FIG. 1.

With additional reference to FIG. 2, seat frame 10 further includes a variable control mechanism 20 used in conjunction with self tightening recliner mechanism 18. Self tightening recliner mechanism 18 includes a drum assembly 22 pivotally coupling back portion 12 to bottom portion 14. One or more bands 24 (two illustrated in this embodiment) are wound about drum assembly 22 to selectively prevent pivotal motion when tightened or allow pivotal motion when loosened. A mechanism for tightening and loosening bands 24 is not described in detail, as there are many mechanism for performing this function, any of which can be employed here. For purposes of this disclosure, opposing ends 26 and 28 of bands 24 are coupled to opposing ends of a lever or pivot block 30. Pivot block 30 is held in a tightened position by pivot elements 32 and 34.

In a simplified description of the operation of self tightening recliner mechanism 18, bands 24 prevent pivotal movement of back portion 12 in the tightened position unless a specific load has been reached or exceeded. If the load is reached, it is desirable that clutching or slipping of the bands occur. When a load is applied to back portion 12 in a forward direction, as indicated by arrowed line A, such as would occur on a seat back of an automobile during a front end collision, ends 26 of bands 24 tend to loosen and ends 28 of bands 24 tend to tighten. If this is allowed to occur uncontrolled, drum assembly 22 will slip and back portion 12 will be allowed to pivot at less than the desired load. To control this action, pivot block 30 is employed. When ends 28 tighten, pivot block 30 pivots about pivot element 34 maintaining tension on ends 26. Drum assembly 22 is designed to clutch (slip) at a predetermined load applied to back portion 12. This is desirable as it will absorb much of the energy of an impact. The amount of load required to cause clutching is determined by the amount of tension applied to ends 26. The amount of tension is determined by the pivot distance of pivot block 30.

Self-tightening recliner mechanism 18 is controlled and made variable by variable control mechanism 20 positioned proximate a front end of pivot block 30. In the preferred embodiment, variable control mechanism 20 includes a stepped stop 36 and a linear actuator 38. The pivotal movement or pivot distance of pivot block 30 is limited by mechanism 20. Stepped stop 36 is positioned under an end of pivot block 30 limiting the distance it can pivot, and therefore also limiting the tension applied to ends 26. The less distance pivot block 30 pivots, the less tension is applied to ends 26, and the less load is required to cause clutching. The plurality of steps in stepped stop 36 permit adjustment of the pivotal movement of pivot block 30 increasing the amount of load required to cause clutching or reducing the amount of load required depending upon decreasing height or increasing height, respectively. The number of steps, one or more, is dependent upon the number of adjustments desired. It is contemplated that a sloped surface can replace a stepped surface to provide a substantially infinite range of adjustments.

Figure 3:
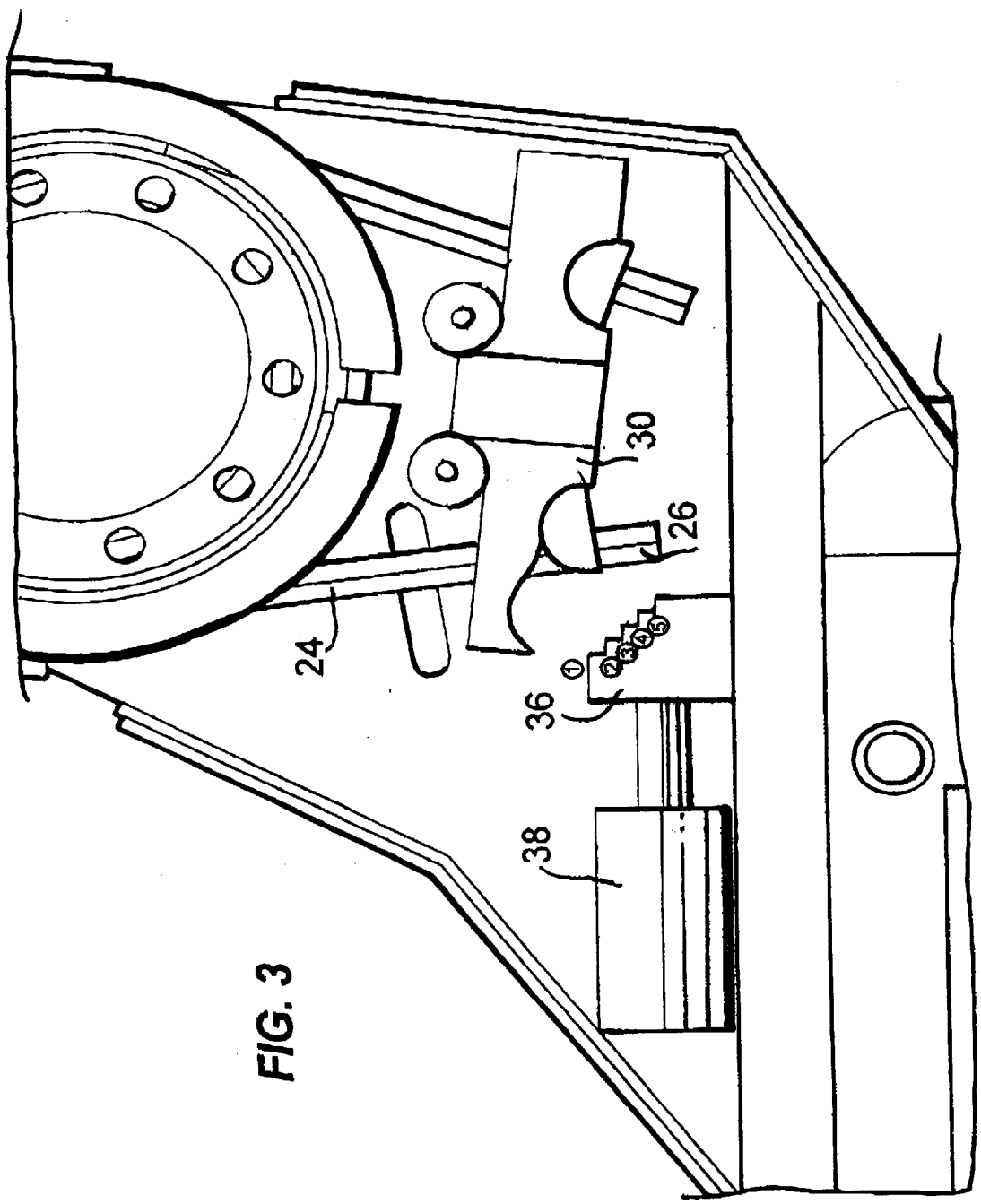
FIG. 3 is an enlarged side elevational view of the variable clutching recliner mechanism of FIG. 1 in the unloaded position.
Figure 4:
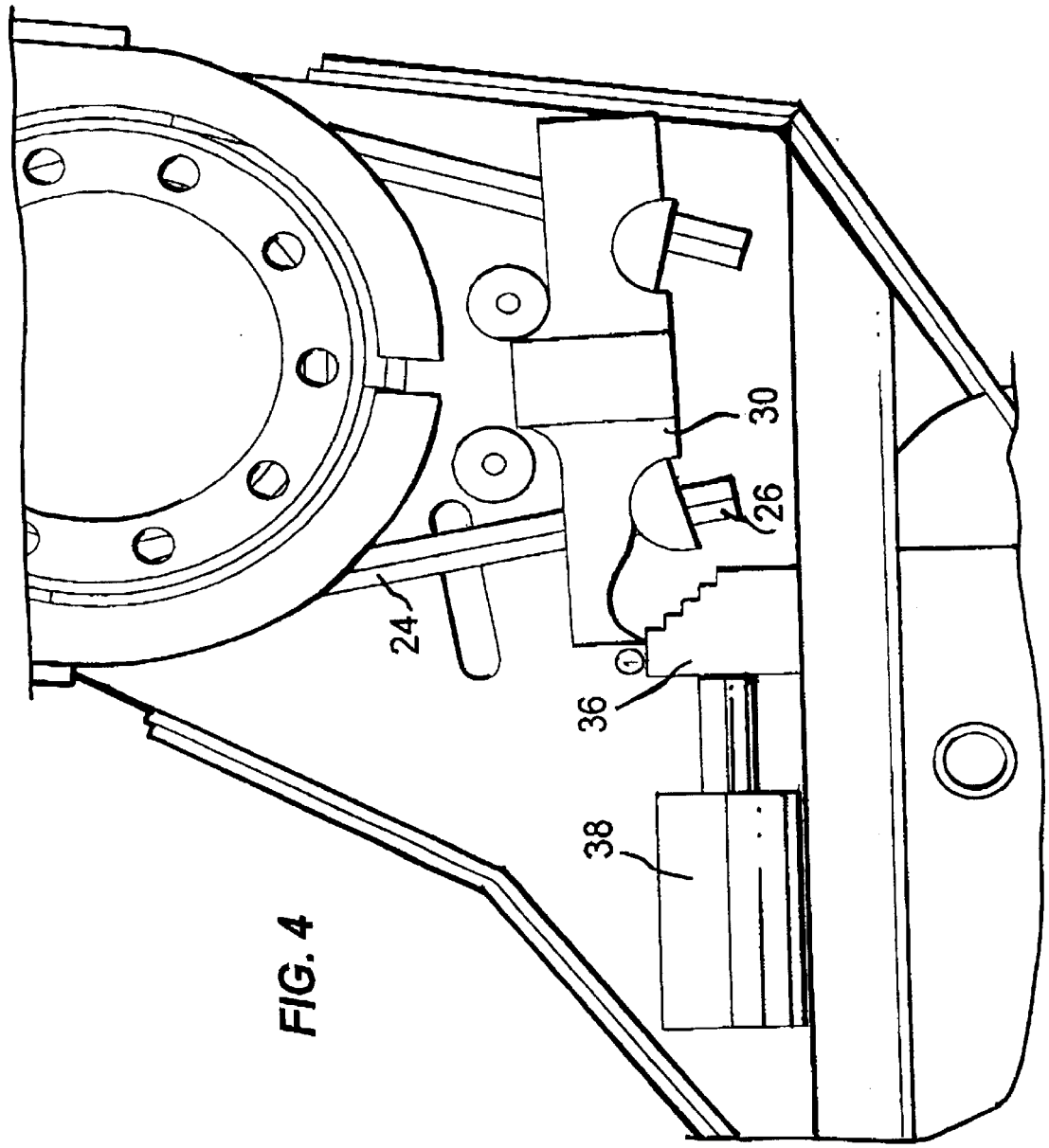
FIGS. 4–6 are enlarged side elevational views of the variable clutching recliner mechanism of FIG. 1 illustrated in several different positions.
Figure 5:
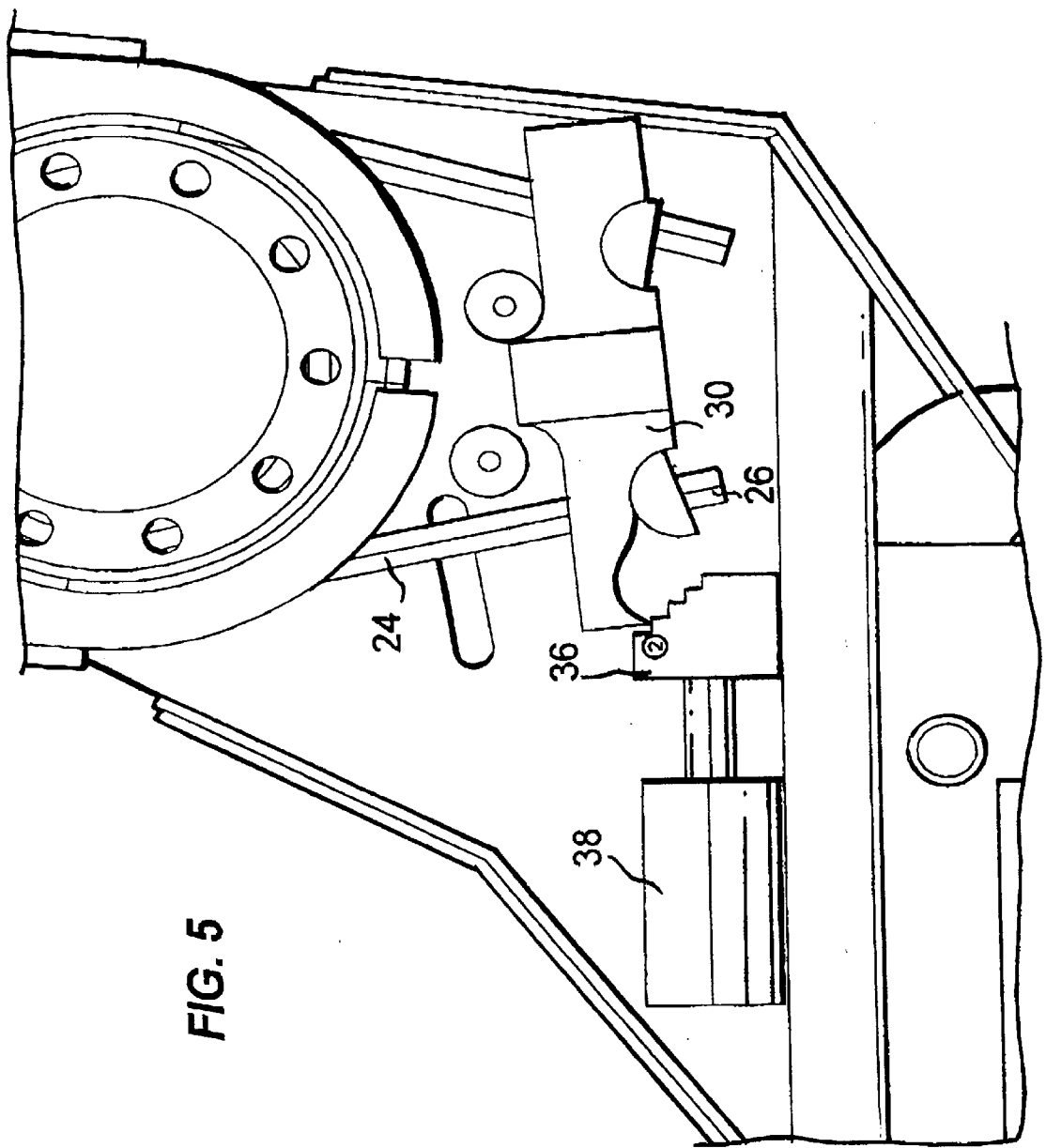
Figure 6:
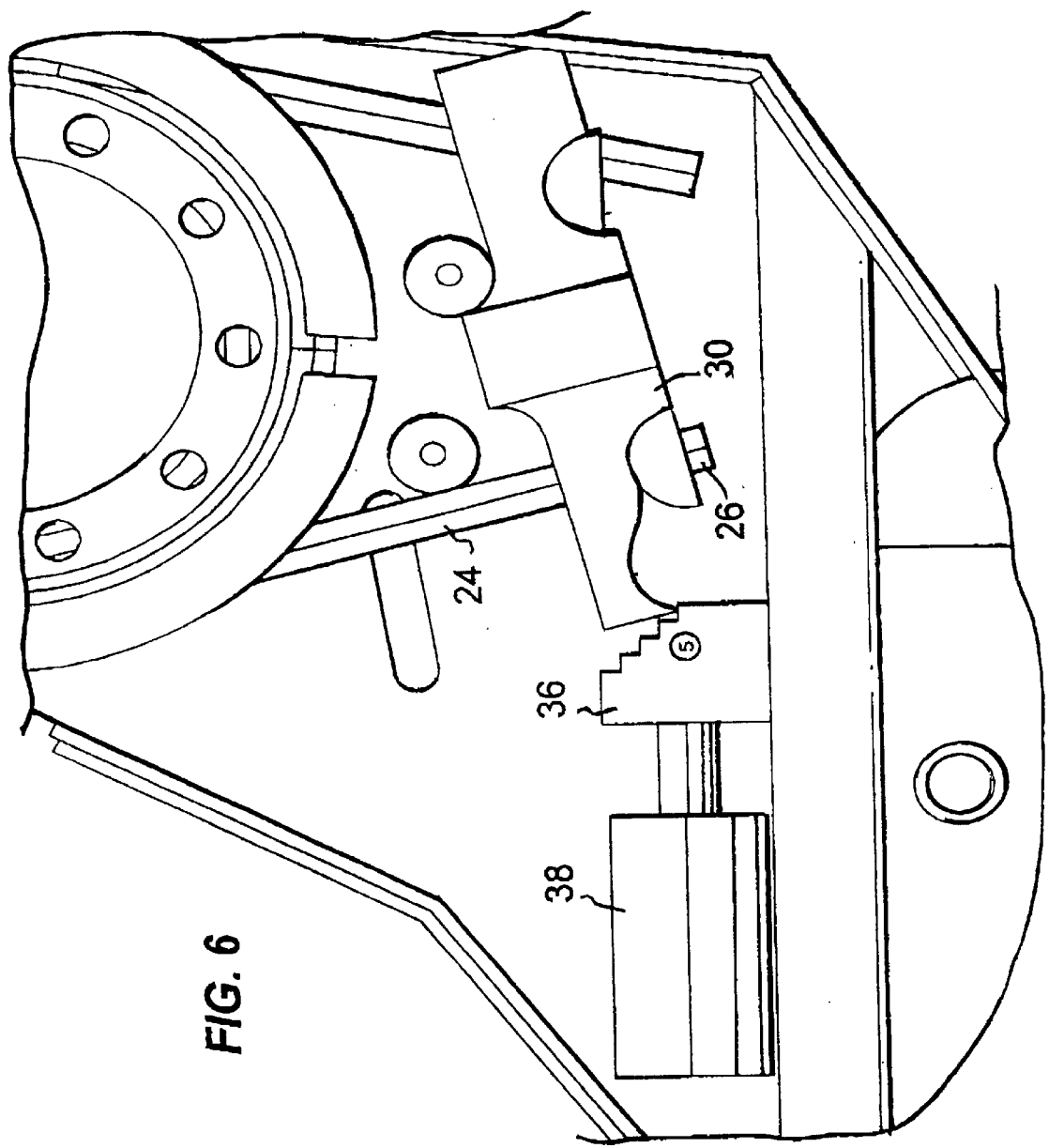

Turning now to FIGS. 3–6, stepped stop 36 is illustrated positioned in various settings for clutching at increased and decreased loads. FIG. 3 illustrates pivot block 30 as it would appear in an unloaded position. Pivot block 30 is not pivoted, and bands 24 are in the locked, or tensioned position preventing further recliner adjustment. FIG. 4 illustrates stepped stop 36 positioned so that when a load is applied, the end of pivot block 30 is stopped at the highest position. Thus, the tension on end 26 is at its lowest allowing clutching at a lower load value. This is a setting that would be desirable for a very small individual. For increasingly larger or heavier individuals, stepped stop 36 is positioned so that pivot block 30 is allowed to pivot an increasing distance as can be seen with reference to FIGS. 5 and 6.

The adjustment of the load is controlled by movement of stepped stop 36. Movement of stepped stop 36 can be accomplished using a linear actuator 38, such as a hydraulic or pneumatic cylinder, an electric motor, etc., either manually controlled or automatically adjusted by a controller. Automation can be carried even further by including a sensor in the seat to determine the weight of an individual. The weight can then be used to determine the ideal setting and desired clutching load, and position stepped stop 36 accordingly.

While a linear actuator, such as an electric motor is preferred, it will be understood that movement of stepped stop 36 can also be accomplished manually. For example, stepped stop 36 can be mounted for reciprocating movement, and latched at the desired position. Furthermore, while positioning of stepped stop 36 is illustrated under one end of pivot block 30 for controlling clutching in the forward direction, mechanism 20 can be positioned under the opposing end of pivot block 30 to control clutching in the rearward direction. It will also be understood that an identical mechanism 20 can be positioned proximate the opposing ends of block 30. In this manner, clutching can be controlled in both the forward and rearward directions.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. Variable clutching seat recliner apparatus comprising:
   a back portion;
   a drum coupled to the back portion;
   a band having a first end and a second end, the band wrapped about the drum inhibiting rotation thereof;
   a tightening mechanism coupled to the first end and the second end such that a force applied to the back portion in either of two opposing directions produces a tension in the band adjacent either one of the first end and the second end and a corresponding loosening of the band adjacent the other of the first end and the second end, the tightening mechanism including a lever pivotable about a fixed pivot point to convert a portion of the tension to reduce the loosening; and
   a variable control mechanism positioned proximate the lever for limiting pivotal movement of the lever.

2. Variable clutching seat recliner apparatus as claimed in claim 1 wherein the variable control mechanism includes a stop element and an actuator for positioning the stop element proximate an end of the lever to limit pivotal movement of the lever in a first direction.

3. Variable clutching seat recliner apparatus as claimed in claim 2 wherein the stop element includes a stepped surface.

4. Variable clutching seat recliner apparatus as claimed in claim 2 wherein the stop element includes a sloped surface.

5. Variable clutching seat recliner apparatus as claimed in claim 2 wherein the actuator is linear.

6. Variable clutching seat recliner apparatus as claimed in claim 2 wherein the variable control mechanism further includes another stop element positioned proximate another end of the lever for limiting pivotal movement of the lever in a second direction.

7. Variable clutching seat recliner apparatus as claimed in claim 1 wherein the fixed pivot point includes a first pivot point and a second pivot point spaced from the first pivot point, each of the first pivot point and the second pivot point defining a ratio, the ratio determining the portion of the tension converted to reduce the loosening, the lever pivoting.about the first pivot point with the force in a first of the opposing direction and the lever pivoting about the second pivot.point with the force in a second of the opposing directions.

8. Variable clutching seat recliner apparatus as claimed in claim 7 further including pivot elements defining the first pivot point and the second pivot point.

9. Variable clutching seat recliner apparatus as claimed in claim 8 wherein the first end and the second end of the band are coupled to-the end and the another end of the lever, respectively.

10. Variable clutching seat recliner apparatus comprising:

a seat back portion;

a base element;

a drum having a first portion coupled to the seat back portion and a second portion coupled to the base element, the first portion and the second portion nested for relative coaxial rotation;

a band having a first end and a second end, the band wrapped about the drum and movable between a tightened condition inhibiting relative rotation of the first and second portion of the drum and a loosened condition permitting relative rotation of the first and second portion of the drum;

a linkage mechanism for moving the band between the tightened condition and the loosened condition;

a tightening mechanism coupled to the first end and the second end of the band such that a force applied to the seat back portion in either of two opposing directions produces a tension in the band adjacent either one of the first end and the second end and a corresponding loosening of the band adjacent the other of the first end and the second end, the tightening mechanism including a lever pivotable about a fixed pivot point to convert a portion of the tension to reduce the loosening; and a variable control mechanism positioned proximate the lever for limiting pivotal movement of the lever.

11. Variable clutching seat recliner apparatus as claimed in claim 10 wherein the variable control mechanism includes a stop element and an actuator for positioning the stop element proximate an end of the lever to limit pivotal movement of the lever in a first direction.

12. Variable clutching seat recliner apparatus as claimed in claim 11 wherein the stop element includes a stepped surface.

13. Variable clutching seat recliner apparatus as claimed in claim 11 wherein the stop element includes a sloped surface.

14. Variable clutching seat recliner apparatus as claimed in claim 11 wherein the actuator is linear.

15. Variable clutching seat recliner apparatus as claimed in claim 11 wherein the variable control mechanism further includes another stop element positioned proximate another end of the lever for limiting pivotal movement of the lever in a second direction.

16. Variable clutching seat recliner apparatus as claimed in claim 10 wherein the fixed pivot point includes a first pivot point and a second pivot point spaced from the first pivot point, each of the first pivot point and the second pivot point defining a ratio, the ratio determining the portion of the tension converted to reduce the loosening, the lever pivoting about the first pivot point with the force in a first of the opposing direction and the lever pivoting about the second pivot point with the force in a second of the opposing directions.

17. Variable clutching seat recliner apparatus as claimed in claim 16 further including pivot elements defining the first pivot point and the second pivot point.

18. Variable clutching seat recliner apparatus as claimed in claim 17 wherein the first end and the second end of the band are coupled to the end and the another end of the lever, respectively.

19. A method of variably clutching seat recliner apparatus comprising the steps of:

providing.seat recliner apparatus including a back portion, a drum coupled to the back portion, a band having a first end and a second end, the band wrapped about the drum inhibiting rotation thereof, a tightening mechanism coupled to the first end and the second end such that a force applied to the back portion in either of two opposing directions produces a tension in the band adjacent either one of the first end and the second end and a corresponding loosening of the band adjacent the other of the first end and the second end, and the tightening mechanism including a lever pivotable about a fixed pivot point to convert a portion of the tension to reduce the loosening, and limiting the conversion of a portion of the tension to reduce the loosening by limiting the pivotal movement of the lever.

20. The method as claimed in claim 19 wherein the step of limiting includes providing a plurality of limits.

* * * * *